US012744995B2

(12) United States Patent
Kumagai et al.

(10) Patent No.: US 12,744,995 B2
(45) Date of Patent: Sep. 22, 2026

(54) IMAGE PROCESSING DEVICE, IMAGE PROCESSING METHOD, AND INFORMATION PROCESSING SYSTEM

(71) Applicant: NEC Corporation, Tokyo (JP)

(72) Inventors: Taichi Kumagai, Tokyo (JP); Jingxiang Chen, Tokyo (JP)

(73) Assignee: NEC CORPORATION, Tokyo (JP)

( * ) Notice: Subject to any disclaimer, the term of this patent is extended or adjusted under 35 U.S.C. 154(b) by 33 days.

(21) Appl. No.: 18/846,738

(22) PCT Filed: Mar. 2, 2023

(86) PCT No.: PCT/JP2023/007900
§ 371 (c)(1),
(2) Date: Sep. 13, 2024

(87) PCT Pub. No.: WO2023/189187
PCT Pub. Date: Oct. 5, 2023

(65) Prior Publication Data

US 2025/0211851 A1 Jun. 26, 2025

(30) Foreign Application Priority Data

Mar. 29, 2022 (JP) ................................ 2022-053557

(51) Int. Cl.
*H04N 23/65* (2023.01)
*H04N 23/61* (2023.01)

(52) U.S. Cl.
CPC ............ *H04N 23/65* (2023.01); *H04N 23/61* (2023.01)

(58) Field of Classification Search
CPC ......... H04N 23/61; H04N 23/65; Y02D 10/00
USPC .......................................................... 348/372
See application file for complete search history.

(56) References Cited

U.S. PATENT DOCUMENTS

2014/0241581 A1* 8/2014 Narayanan ................ G06T 7/73 382/103
2016/0080652 A1* 3/2016 Shirota ................ G06K 7/1404 348/222.1
2021/0080966 A1* 3/2021 Tran ......................... G06N 3/04
2021/0195128 A1* 6/2021 Hanada ................ H04N 13/239
2022/0281413 A1* 9/2022 Liu ......................... B60R 25/31
2022/0413804 A1* 12/2022 Vanesko ............... G06F 18/214
(Continued)

FOREIGN PATENT DOCUMENTS

JP 2007-324809 A 12/2007
JP 2011-237884 A 11/2011
(Continued)

OTHER PUBLICATIONS

JP Office Communication for JP Application No. 2022-053557, mailed on Jun. 24, 2025 with English Translation.
(Continued)

*Primary Examiner* — Lin Ye
(74) *Attorney, Agent, or Firm* — Sughrue Mion, PLLC

(57) ABSTRACT

An image processing device 100 of the present invention includes: a first processing means 121 that performs a first process of recognizing a first target from an image; an identification means 122 that identifies power consumption required for the first process; and a determination means 123 that determines whether to perform a second process of recognizing a second target from the image according to the identified power consumption.

17 Claims, 10 Drawing Sheets

(56) References Cited

U.S. PATENT DOCUMENTS

| | | | | |
|---|---|---|---|---|
| 2023/0074386 | A1* | 3/2023 | Zhang | H04N 23/65 |
| 2024/0153033 | A1* | 5/2024 | Wang | H04N 19/103 |
| 2024/0219990 | A1* | 7/2024 | Dekel | G06F 1/325 |

FOREIGN PATENT DOCUMENTS

| | | | |
|---|---|---|---|
| JP | 2018-148454 | A | 9/2018 |
| JP | 2020-038410 | A | 3/2020 |
| JP | 2020-160814 | A | 10/2020 |
| JP | 2021-099698 | A | 7/2021 |

OTHER PUBLICATIONS

International Search Report for PCT Application No. PCT/JP2023/007900, mailed on May 23, 2023.

* cited by examiner

10
IMAGE PROCESSING DEVICE
11
IMAGE ACQUISITION UNIT
12
OBJECT DETECTION UNIT
13
POWER MANAGEMENT UNIT
14
INFORMATION GENERATION UNIT
15
NETWORK POWER RECEPTION UNIT
C
IMAGE-CAPTURING DEVICE
20
MANAGEMENT/CONTROL DEVICE
25
COMMUNICATION UNIT
21
GRID SETTING UNIT
22
MANAGEMENT/CONTROL UNIT

START

S1 RECEIVE GRID SETTING

S2 ACQUIRE IMAGES

S3 RECOGNIZE ROBOT

S4 TRANSMIT ROBOT POSITION

S5 CALCULATE POWER CONSUMPTION

S6 POWER CONSUMPTION < THRESHOLD?

Yes

No

S7 RECOGNIZE OBSTACLES

S8 TRANSMIT GRID INFORMATION

S9 CALCULATE POWER CONSUMPTION

S10 POWER CONSUMPTION < THRESHOLD?

Yes

No

S11 IDENTIFY TYPES OF OBSTACLES

S12 TRANSMIT OBSTACLE INFORMATION

IMAGE PROCESSING DEVICE, IMAGE PROCESSING METHOD, AND INFORMATION PROCESSING SYSTEM

This application is a National Stage Entry of PCT/JP2023/007900 filed on Mar. 2, 2023, which claims priority from Japanese Patent Application 2022-053557 filed on Mar. 29, 2022, the contents of all of which are incorporated herein by reference, in their entirety.

TECHNICAL FIELD

The present invention relates to an image processing device, an image processing method, and an information processing system.

BACKGROUND ART

Use of technologies to detect objects from image data in various areas has been considered. For example, Patent Literature 1 discloses that moving bodies like humans are detected from image data of an image captured by a surveillance camera installed in a store.

Here, a surveillance camera like the one mentioned above can be installed on a ceiling or a wall in a store. For example, Patent Literature 2 discloses that power is supplied to a network camera and an image processing device by PoE (Power over Ethernet).

CITATION LIST

Patent Literatures

Patent Literature 1: JP 2011-237884 A
Patent Literature 2: JP 2018-148454 A

SUMMARY OF INVENTION

Technical Problem

On the other hand, power supply to a target installed on a ceiling or a wall in a store is limited in terms of the value of power that can be supplied. Because of this, in Patent Literature 2, the processing status is changed according to the power consumption of the network camera and the image processing device according to the power consumption. In particular, Patent Literature 2 discloses that an image recognition process is stopped in a low power consumption operation mode.

However, if the image recognition process is stopped undesirably according to the power consumption as disclosed in Patent Literature 2, desired image processing results cannot be obtained. Because of this, there is a problem that the operational stability of a system that executes predetermined processes using results of image processing on images lowers. In addition, problems similar to that mentioned above occur not only in a system in which power is supplied by PoE, but also in a system in which power is supplied by any power supply method.

Accordingly, an object of the present invention is to improve the operational stability of a system that uses results of image processing on images.

Solution to Problem

An image processing device according to an aspect of the present invention includes:

a first processing means that performs a first process of recognizing a first target from an image;

an identification means that identifies power consumption required for the first process; and a determination means that determines whether to perform a second process of recognizing a second target from the image according to the identified power consumption.

In addition, an image processing method according to an aspect of the present invention includes:

performing a first process of recognizing a first target from an image;

identifying power consumption required for the first process; and determining whether to perform a second process of recognizing a second target from the image according to the identified power consumption.

In addition, an information processing system according to an aspect of the present invention includes:

a first processing means that performs a first process of recognizing a first target from an image;

an identification means that identifies power consumption required for the first process; and a determination means that determines whether to perform a second process of recognizing a second target from the image according to the identified power consumption.

In addition, a program according to an aspect of the present invention causes a computer to execute processes of:

performing a first process of recognizing a first target from an image;

identifying power consumption required for the first process; and determining whether to perform a second process of recognizing a second target from the image according to the identified power consumption.

Advantageous Effects of Invention

By being configured in the manners above, the present invention makes it possible to attempt to improve the operational stability of a system that uses results of image processing on images.

DESCRIPTION OF EMBODIMENTS

First Example Embodiment

Figure 1:
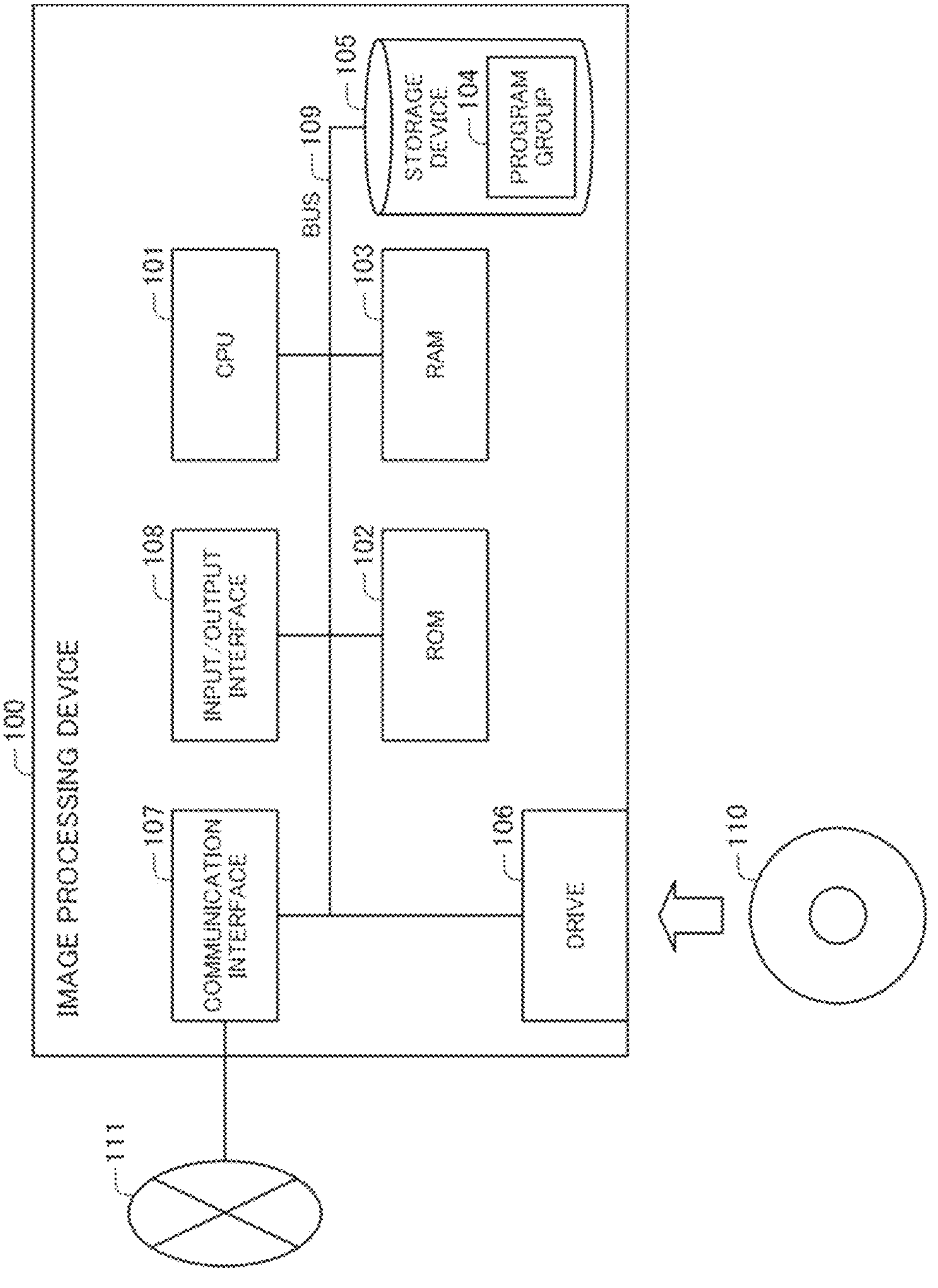
FIG. 1 is a block diagram depicting the hardware configuration of an image processing device in a first example embodiment of the present invention.
Figure 2:
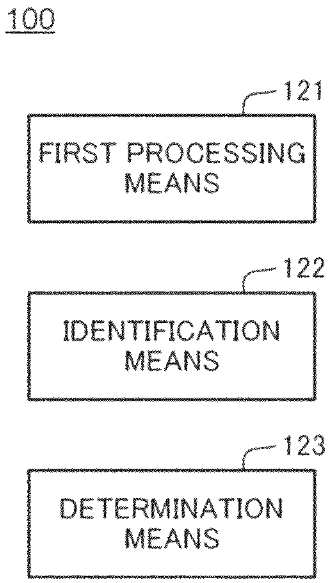
FIG. 2 is a block diagram depicting the configuration of the image processing device in the first example embodiment of the present invention.
Figure 3:
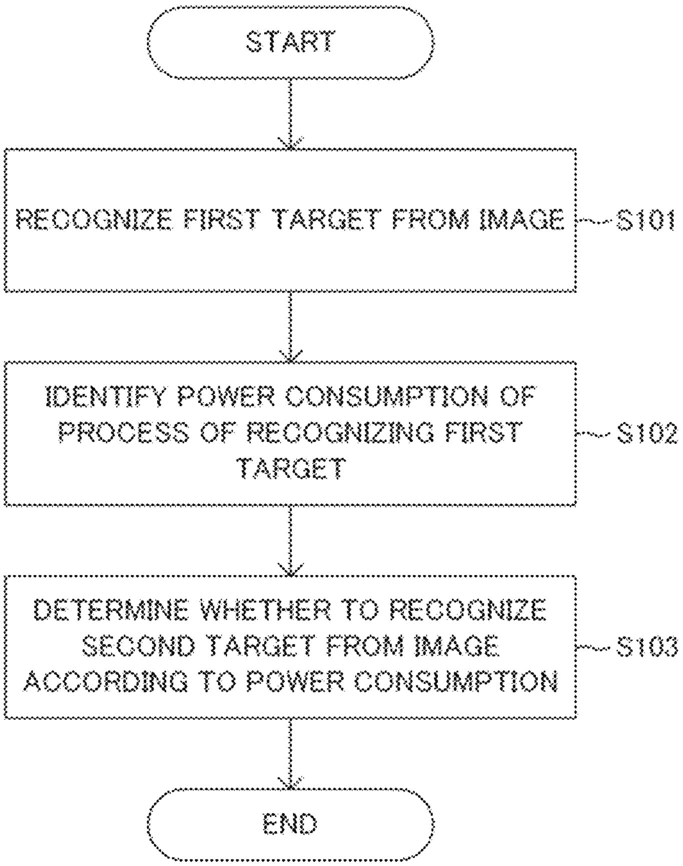
FIG. 3 is a flowchart depicting an operation performed by the image processing device in the first example embodiment of the present invention.

Next, a first example embodiment of the present invention is explained with reference to FIG. 1 to FIG. 3. FIG. 1 to FIG. 2 are block diagrams depicting the configuration of an image processing device in the first example embodiment, and FIG. 3 is a flowchart depicting an operation performed by the image processing device. Note that outlines of the configurations of the image processing device, an information processing system, and an image processing method to be explained in example embodiments mentioned later are depicted in the present example embodiment.

First, the hardware configuration of an image processing device 100 in the present example embodiment is explained with reference to FIG. 1. The image processing device 100 is configured using a typical information processing device, and has a hardware configuration like the one below as an example.

- Central Processing Unit (CPU) 101 (arithmetic operation device)
- Read Only Memory (ROM) 102 (storage device)
- Random Access Memory (RAM) 103 (storage device)
- Program group 104 to be loaded to RAM 103
- Storage device 105 having stored thereon the program group 104
- Drive 106 that performs reading and writing on a storage medium 110 outside the information processing device
- Communication interface 107 connected to a communication network 111 outside the information processing device
- Input/output interface 108 for performing input/output of data
- Bus 109 connecting the respective constituent elements Then, the image processing device 100 can construct and have a first processing means 121, an identification means 122, and a determination means 123 depicted in FIG. 2 through acquisition of the program group 104 and execution thereof by the CPU 101. Note that the program group 104 is stored on, for example, the storage device 105 or the ROM 102 in advance, is loaded to the RAM 103 by the CPU 101, and is executed by the CPU 101 as needed. In addition, the program group 104 may be supplied to the CPU 101 via the communication network 111, or may be stored on the storage medium 110 in advance, read out by the drive 106, and supplied to the CPU 101. It should be noted that the first processing means 121, the identification means 122, and the determination means 123 mentioned above may be constructed using electronic circuits dedicated for realizing the means.

Note that FIG. 1 depicts an example of the hardware configuration of the information processing device that is the image processing device 100. The hardware configuration of the information processing device is not limited to that mentioned above. For example, the information processing device may be configured using part of the configuration mentioned above, such as without the drive 106. In addition, the image processing device 100 may be configured using a plurality of information processing devices. Then, the first processing means 121, the identification means 122, and the determination means 123 mentioned above do not necessarily have to be mounted on one information processing device. For example, the respective means 121, 122, and 123 themselves or respective processing functions that the respective means have may be mounted dispersedly on a plurality of information processing devices. That is, the information processing system configured using the plurality of information processing devices may include the respective means 121, 122, and 123 described above.

Then, by functions of the first processing means 121, the identification means 122, and the determination means 123 constructed by programs as mentioned above, the image processing device 100 executes an image processing method depicted in a flowchart in FIG. 3.

As depicted in FIG. 3, the image processing device 100 executes processes of:

- performing, by the first processing means 121, a first process of recognizing a first target from an image (step S101);
- identifying, by the identification means 122, power consumption required for the first process (step S102); and
- determining, by the determination means 123, whether to perform a second process of recognizing a second target from the image according to the identified power consumption (step S103).

Here, the image is an image of a predetermined space where there can be a recognition target. For example, the image may be any image acquired by any image-capturing device such as a distance image captured by an image-capturing device such as a depth camera, a stereo camera, or a three-dimensional LiDAR (Light Detection And Ranging), or an RGB image captured by an image-capturing device like a spectral camera, or may be a combination of multiple types of image. In addition, the first target includes any moving or stationary object such as a robot, delivery goods, a human, or a vehicle. Then, the first process represents a process of detecting the first target from within the image in a case where the first target is included in the image. For example, whereas the first target is detected in the first process by detecting, from within the image, characteristics (a distance, a shape, a color, etc.) that the first target has, the first target may be detected by any process.

In addition, the power consumption required for the first process is power consumed by the image processing device when the image processing device executes the first process mentioned above. Note that the amount of the power consumption required for the first process may be power consumption of the image processing device at the end of the first process. Then, identifying the power consumption represents acquiring the value of the power consumption, and, for example, means acquiring a value detected at a device that detects power, or acquiring power consumption calculated from processing content. In addition, determining according to the identified power consumption represents determining according to the level of the value of the identified power consumption, and, for example, may mean determining to perform the second process in a case where the value of the power consumption is smaller than a set threshold. Note that the threshold may be a preset value, or may be a value set according to the value of the power consumption.

In addition, the second target includes any moving or stationary object such as a robot, delivery goods, a human, or a vehicle, and is an object different from the first target mentioned above. Then, the second process represents a process of detecting the second target from within the image in a case where the second target is included in the image.

For example, whereas the second target is detected in the second process by detecting, from within the image, characteristics (a distance, a shape, a color, etc.) by which it is possible to determine that an object is the second object different from the first target, the second target may be detected by any process. In addition, determining whether to perform the second process represents determining to execute the second process according to the level of the value of the power consumption mentioned above.

In the present invention, by the configuration mentioned above, first, the first processing means 121 of the image processing device 10 detects whether the first target is included in an image captured by an image-capturing device 130. Then, the first processing means 121 executes the first process of detecting the first target from the image in a case where the first target is included in the image. Next, the identification means 122 of the image processing device 100 detects power consumption required for the first process, that is, the value of power consumed by the image processing device 100 itself required for the process in which the first target has been detected from the image. Then, the determination means 123 of the image processing device 100 determines whether the value of the detected power consumption satisfies a preset criterion. The image processing device 100 determines to perform the second process of further detecting the second target from the image in a case where the power consumption satisfies the preset criterion.

In this manner, recognition of the second target is performed according to the power consumption required for recognition of the first target in the present invention. Accordingly, the operational stability of the system that executes predetermined processes using image processing results can be improved. Specifically, recognition of the second target is performed according to the power consumption required for recognition of the first target, that is, recognition of the second target is performed further in a case where there is extra power to be consumed. Accordingly, it is possible to reduce the possibility of control-target recognition failures due to power shortage, and it is possible to stably operate the system that executes predetermined processes using image processing results.

Second Example Embodiment

Figure 4:
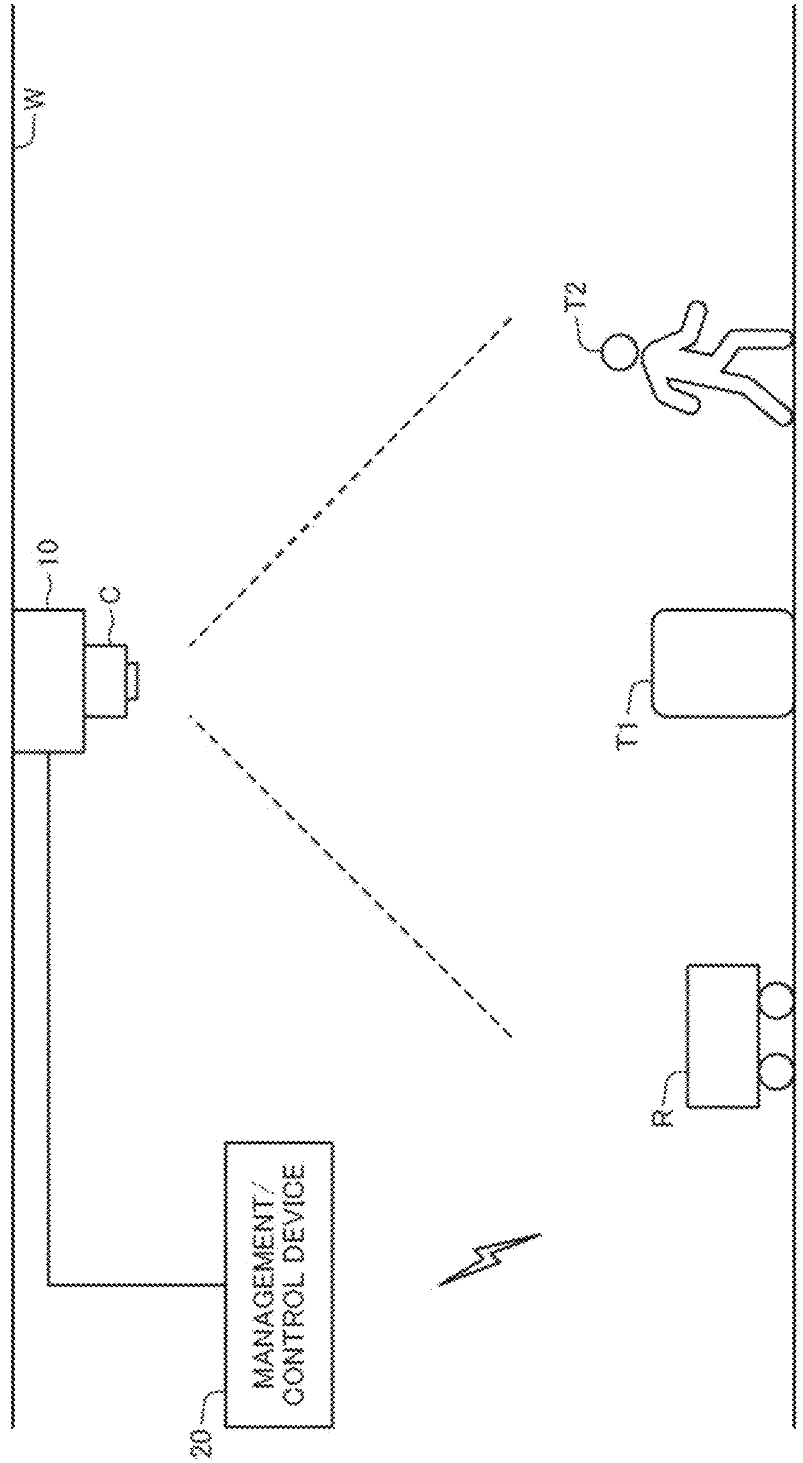
FIG. 4 is a schematic diagram depicting the configuration of the information processing system in a second example embodiment of the present invention.
Figure 5:
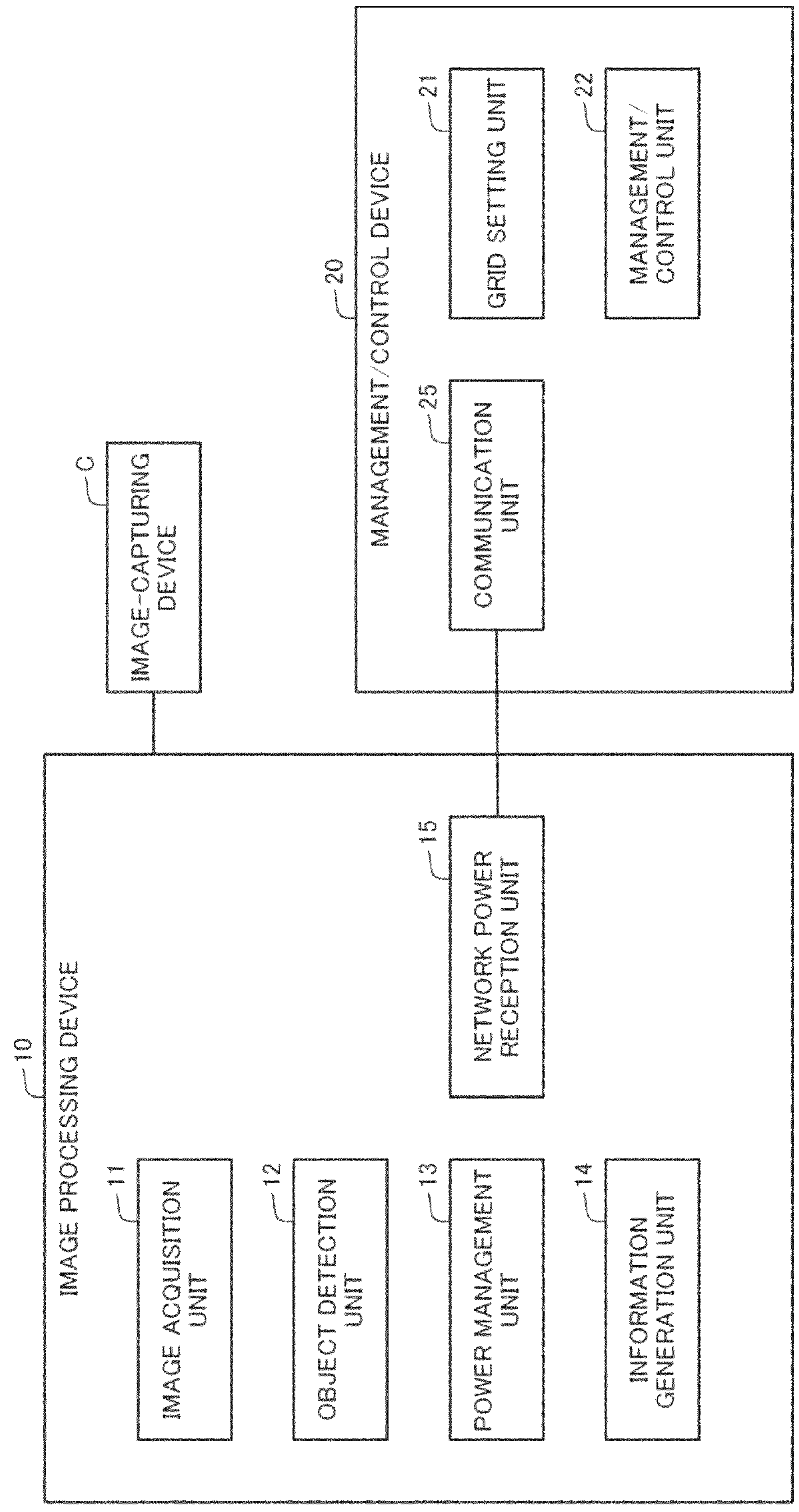
FIG. 5 is a block diagram depicting the configurations of the image processing device and a management/control device disclosed in FIG. 4.
Figure 6:
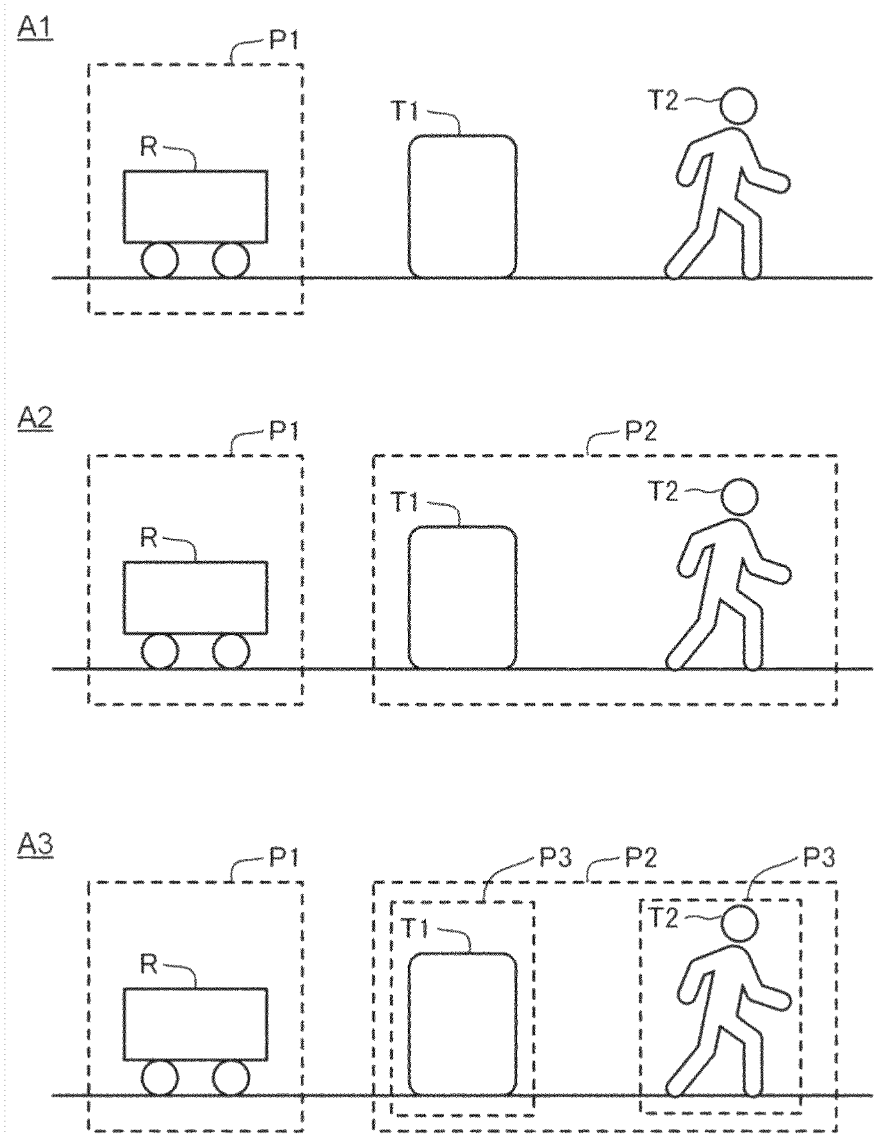
FIG. 6 is a figure depicting a state of a process performed by the image processing device disclosed in FIG. 5.
Figure 7:
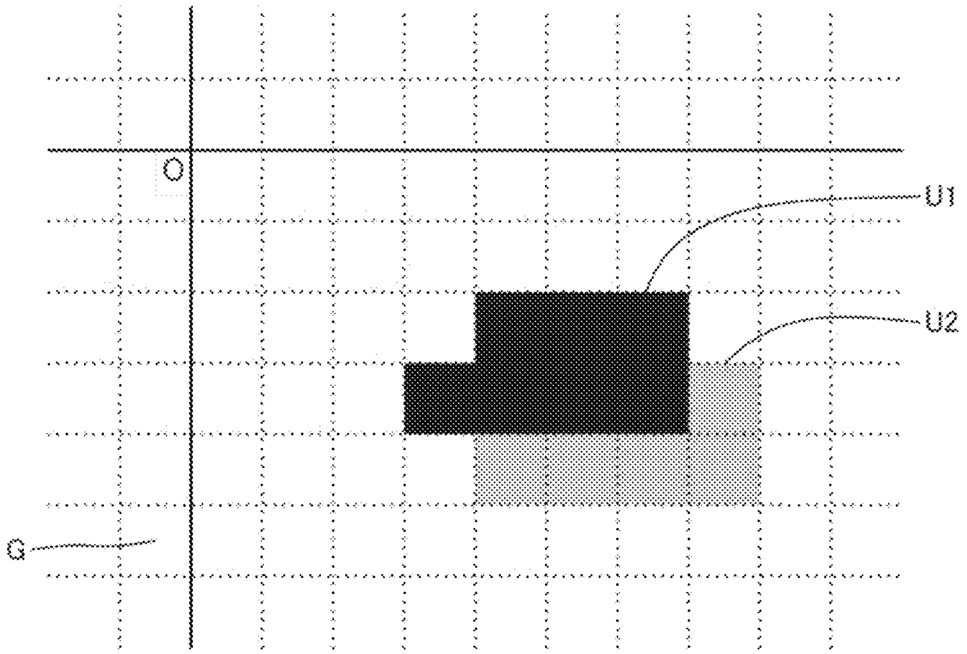
FIG. 7 is a figure depicting a state of a process performed by the image processing device disclosed in FIG. 5.
Figure 8:
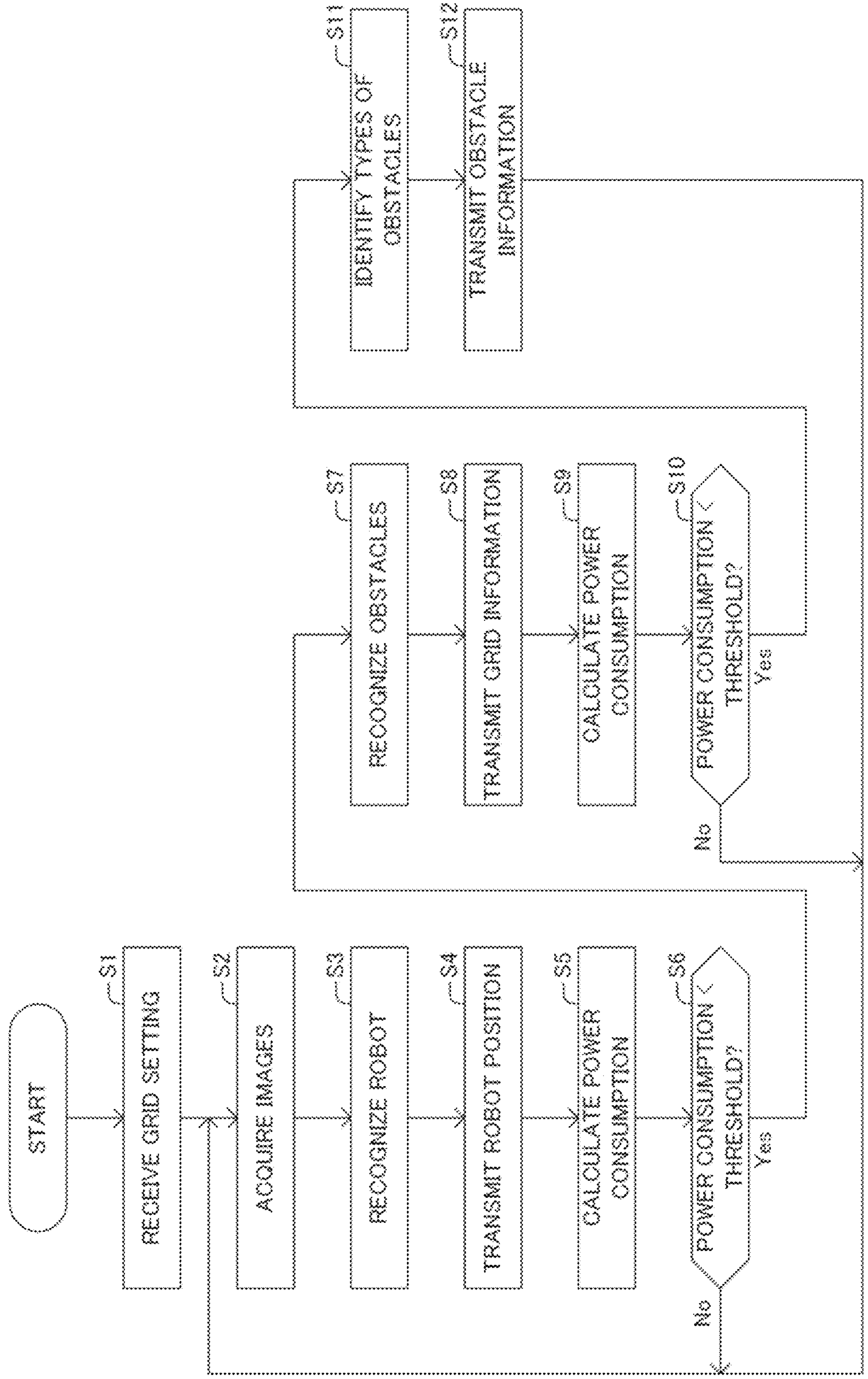
FIG. 8 is a flowchart depicting an operation performed by the image processing device disclosed in FIG. 5.

A second example embodiment of the present invention is explained with reference to FIG. 4 to FIG. 8. FIG. 4 to FIG. 5 are figures for explaining the configuration of the information processing system, and FIG. 6 to FIG. 8 are figures for explaining processing operations performed by the information processing system.

Configuration

The information processing system in the present invention is configured using an image-capturing device C that captures images of a predetermined space, and the image processing device 10 that processes the captured images. Note that, for example, the predetermined space, which is an image-capturing target, is the inside of a warehouse where objects to be conveyed are arranged, and is a space where an unmanned travelable conveyance robot R conveys the objects to be conveyed. Because of this, the predetermined space is a space where the conveyance robot R travels, and the information processing system is configured to control the conveyance robot R as a control target.

As depicted in FIG. 4, the image-capturing device C is installed on a ceiling W or a wall of the warehouse or the like, and is configured to capture images of an area where the control-target conveyance robot R moves. In addition, the image processing device 10 detects the position of the conveyance robot R moving for conveying an article in the warehouse by processing a captured image, and detects also the positions of objects other than the conveyance robot R, for example, the positions of a human T2 and placed delivery goods T1 which are obstacles that can be hindrances to the movement of the conveyance robot R. Then, the positions of the conveyance robot R and the obstacles T1 and T2 detected by the image processing device 10 are notified to a management/control device 20, and used for control of the movement of the conveyance robot R. Note that, whereas the image processing device 10 and the management/control device 20 are depicted as discrete devices FIG. 4, the image processing device 10 and the management/control device 20 may be configured using one information processing device.

It should be noted that the information processing system in the present invention is not necessarily installed in a warehouse, but may be installed at any location. For example, the information processing system may be installed in a factory such as a manufacturing line where industrial robots like robot arms are installed, or may be installed in an outdoor space where there are many humans and devices. In addition, objects to be detected by the image processing device 10 are also not necessarily the robot R and the obstacles T1 and T2, but any objects may be treated as detection targets. Then, the information processing system may be used for any use. Hereinbelow; the configuration of the information processing system is explained in detail.

The image-capturing device C is installed on the ceiling W in the warehouse, and is configured to capture images of a predetermined area in the warehouse from above. It should be noted that the image-capturing device C is not necessarily installed on the ceiling W, but may be installed at any location such as a wall or a stand. Because of this, images captured by the image-capturing device C also are not necessarily images as seen from above, but may be images captured from any direction.

Then, the image-capturing device C in the present example embodiment is a depth camera, and is configured to capture distance images whose pixel values represent distance values (depths). For example, the image-capturing device C may be an image-capturing device like a three-dimensional LiDAR adopting a scheme by which a distance to an object is measured on the basis of time of flight taken by an infrared laser projected onto the object to return, or may be an image-capturing device adopting any scheme such as an image-capturing device like a stereo camera that captures distance images using parallax. Then, the image-capturing device C captures images at certain time intervals, and passes the images to the image processing device 10. It should be noted that the image-capturing device C is not necessarily a depth camera, but may be any camera such as a spectral camera that captures RGB images, or may be a combination of multiple types of camera. In addition, images captured by the image-capturing device C are not necessarily distance images, but may be any images such as RGB images, or may be combinations of multiple types of image. Note that it is assumed in the present example embodiment that the image-capturing device C captures and acquires two types of image, distance images and RGB images.

The image processing device 10 is configured using one or more information processing devices including an arithmetic operation device and a storage device. In particular, the image processing device 10 in the present example embodiment is configured integrally with the image-capturing device C mentioned above, and is installed on the ceiling W in the warehouse along with the image-capturing device C. For example, the image processing device 10 is configured as a so-called network camera since it is configured using a single board computer such that it can be installed on the ceiling W, and it is integrated with the image-capturing device C. It should be noted that the image processing device 10 is not necessarily configured integrally with the image-capturing device C, and may be configured separately from the image-capturing device C. In addition, the image processing device 10 is not necessarily installed on the ceiling W, and may be installed at any location such as a wall or a rack.

Then, as depicted in FIG. 5, the image processing device 10 includes a network power reception unit 15, and can receive power supply using a communication network. Specifically, by connecting a LAN (Local Area Network) cable to the network power reception unit 15 of the image processing device 10, it becomes possible for the image processing device 10 to receive power supply by PoE (Power over Ethernet). Note that there is an upper limit of power supplied to the image processing device 10 although the upper limit varies depending on the length and quality of the LAN cable. Because of this, the image processing device 10 is to be operated using power supplied by PoE in a state where the upper limit value of power consumption is set. Note that the image-capturing device C configured integrally with the image processing device 10 also is to be operated using power supplied to the image processing device 10 by PoE. It should be noted that the image processing device 10 is not necessarily supplied with power by PoE, but may be supplied with power by any method.

In addition, as depicted in FIG. 5, the image processing device 10 includes an image acquisition unit 11, an object detection unit 12, a power management unit 13, and an information generation unit 14. Respective functions of the image acquisition unit 11, the object detection unit 12, the power management unit 13, and the information generation unit 14 can be realized by execution, by the arithmetic operation device, of programs for realizing the respective functions stored on the storage device. Note that the image processing device 100 may be configured using a plurality of information processing devices. Then, the image acquisition unit 11, the object detection unit 12, the power management unit 13, and the information generation unit 14 mentioned above do not necessarily have to be mounted on one information processing device. For example, the respective sections 11 to 14 themselves or respective processing functions that the respective sections have may be mounted dispersedly on a plurality of information processing devices. That is, the information processing system configured using the plurality of information processing devices may include the respective sections 11 to 14 described above. Hereinbelow; respective configurations are mentioned in detail.

The image acquisition unit 11 acquires images which are distance images and RGB images captured by the image-capturing device C, and temporarily stores the images on the storage device. At this time, images are captured at certain time intervals at the image-capturing device C. Accordingly; the image acquisition unit 11 sequentially acquires the images, and stores the images on the storage device.

The object detection unit 12 (first processing means, second processing means, third processing means, determination means) performs processes of recognizing objects from the acquired images. Specifically, the object detection unit 12 first performs a process (first process) of recognizing the conveyance robot R (first target) that can be present in images using distance images. At this time, the object detection unit 12 executes the process of recognizing the conveyance robot R always at time intervals like, for example, several dozen microseconds to one hundred microseconds.

As an example, the object detection unit 12 stores in advance the height of the top of the head of the conveyance robot R, and recognizes, as the conveyance robot R, an object with the stored height from within an image which is a distance image. For example, the top of the head of the conveyance robot R is formed to have a planar surface with a predefined shape (e.g. a rectangle), and its height is predefined. Because of this, by recognizing an object with the stored height, the object detection unit 12 can recognize the object as the conveyance robot R. At this time, the object detection unit 12 may recognize the conveyance robot R taking into consideration the outline shape of an object also. Note that the object detection unit 12 may recognize the conveyance robot R by any method from within an image. For example, the object detection unit 12 may recognize the conveyance robot R from within an RGB image using the image. As an example, the upper surface of the conveyance robot R may be caused to display a QR code including identification information for identifying the conveyance robot R. and the conveyance robot R may be recognized by reading the QR code from an RGB image. Then, the object detection unit 12 passes the coordinates of the conveyance robot R recognized in an image to the information generation unit 14. Note that a reference sign A1 in FIG. 7 denotes a state of the process mentioned above, and, as represented by a reference sign P1, the conveyance robot R is to be recognized from within an image.

In addition, the object detection unit 12 also performs a process (second process) of recognizing objects other than the conveyance robot that can be present in images, for example the delivery goods T1 and the human T2 that can be obstacles like the ones depicted in FIG. 4. At this time, the object detection unit 12 executes the process of recognizing obstacles at time intervals like, for example, several hundred microseconds to one second, that is, at time intervals longer than the time intervals of the process of recognizing the conveyance robot R mentioned above. It should be noted that the object detection unit 12 executes the process of recognizing obstacles according to power consumption of image processing device 10 in operation. For example, power consumption of the image processing device 10 in operation is to be identified at the power management unit 13 mentioned later, but the object detection unit 12 determines to execute the process of recognizing obstacles, and executes the process of recognizing obstacles in a case where the identified power consumption is lower than a set threshold. On the other hand, the object detection unit 12 does not execute the process of recognizing obstacles in a case where the identified power consumption is equal to or greater than the set threshold. Note that the threshold to be compared with the power consumption at this time is a first threshold, and is preset to a value smaller than the upper limit value of power consumption set for the image processing device 10.

Specifically; the object detection unit 12 performs the process of recognizing obstacles in the following manner. At this time, in the present example embodiment, the object detection unit 12 performs the process of recognizing obstacles from within images using a distance image and an RGB image in combination. It should be noted that the object detection unit 12 does not necessarily use a distance image and an RGB image in combination, but may use either one image, or may use another image.

First, as represented by dotted lines in FIG. 7, the object detection unit 12 sets lattice-like grid squares G in images. For example, an intersection O of orthogonal solid lines depicted in FIG. 7 represents the center position of the image-capturing device C, and the grid squares G arrayed around the center position as their reference point are set. Note that the size of the grid squares G and their reference point are notified from a grid setting unit 21 of the management/control device 20 as mentioned later.

Then, the object detection unit 12 recognizes, from the distance image, areas with heights (depths) other than the height of the conveyance robot R mentioned above, and recognizes the individual areas as individual obstacle areas. For example, the object detection unit 12 recognizes, as one obstacle area, areas with heights (depths) that are deemed to be identical out of the heights that are different from the height of the conveyance robot R. At this time, the object detection unit 12 may capture in advance an initial image when there are no obstacles, and recognize obstacle areas by obtaining differences between the initial image and a newly acquired image. In addition, the object detection unit 12 may recognize obstacle areas using not only a distance image, but also an RGB image, and performing a process of obtaining differences like the one mentioned above, and so on. Then, for each grid square G set as mentioned above, the object detection unit 12 determines whether or not the grid square G corresponds to an obstacle area. At this time, the object detection unit 12 determines that there is an obstacle at a grid square G at a position corresponding to the coordinates of an obstacle area, and determines that there is not an obstacle at a grid square G at a position corresponding to the coordinates of a non-obstacle area. For example, in the example in FIG. 7, it is determined that there is an obstacle at grid squares painted in black and denoted with a reference sign U1. On the other hand, the object detection unit 12 determines that it is unknown whether there is an obstacle at grid squares G in a case where the grid squares G are positioned around an obstacle area, but it cannot be determined, from an RGB image, that the grid squares G are an obstacle area by the recognition process mentioned above due to the shadow of an object or the like. For example, in the example in FIG. 7, it is determined that it is unknown whether there is an obstacle at grid squares painted in gray and denoted with a reference sign U2. Then, the object detection unit 12 notifies the information generation unit 14 of a determination result about each grid square G. For example, the object detection unit 12 notifies the information generation unit 14 of positional information about each grid square G for which a determination U1 that there is an obstacle has been made or a determination U2 that it is unknown whether there is an obstacle has been made. Note that, for example, the positional information about a grid square G may be information about the arrangement position of the grid square G in the image, may be the coordinates of the vertices of the grid square G in the image, or may be any information as long as it is information that can identify the position of the grid square G in the image.

Here, a reference sign A2 in FIG. 6 denotes a state where the obstacles T1 and T2 mentioned above are recognized. As depicted in the figure denoted with the reference sign A2, in a case where the obstacles T1 and T2 are recognized as mentioned above, the conveyance robot R in the frame denoted with the reference sign P1 mentioned above is recognized from within the image, and the obstacles T1 and T2 in the frame denoted with a reference sign P2 are recognized.

Note that, whereas it is assumed in the description above that the object detection unit 12 recognizes obstacles by setting the grid squares G in the images, and detecting an obstacle for each grid square G, obstacles may be recognized from images by any method. For example, the object detection unit 12 may recognize obstacles by detecting, as obstacles, objects other than the conveyance robot R that do not have characteristics (e.g. the height and shape) of the conveyance robot R from a distance image and an RGB image, and detecting the coordinates of the obstacles in the image.

Furthermore, the object detection unit 12 performs a further process (third process) on the images regarding the obstacles recognized as mentioned above. Here, the object detection unit 12 performs a process of identifying the types of the recognized obstacles. At this time, the object detection unit 12 executes the process of identifying the types of obstacles at time intervals like, for example, one second or longer, that is, at time intervals longer than the time intervals of the process of recognizing obstacles mentioned above. It should be noted that the object detection unit 12 executes the process of recognizing obstacles according to power consumption of image processing device 10 in operation. For example, power consumption of the image processing device 10 in operation is to be identified at the power management unit 13 mentioned later, but the object detection unit 12 determines to execute the process of identifying the types of obstacles, and executes the process of identifying the types of obstacles in a case where the identified power consumption is lower than a set threshold. On the other hand, the object detection unit 12 does not execute the process of identifying the types of obstacles in a case where the identified power consumption is equal to or greater than the set threshold. Note that the threshold to be compared with the power consumption at this time is a second threshold, and is preset to a value smaller than the upper limit value of power consumption set for the image processing device 10.

Note that the object detection unit 12 executes the process of identifying the types of obstacles according to a result of the process of recognizing obstacles. For example, when the object detection unit 12 has recognized obstacles as mentioned above, the object detection unit 12 identifies the number of the obstacles. Then, the object detection unit 12 notifies the power management unit 13 of the number of the identified obstacles. Then, as mentioned later, the power management unit 13 estimates power consumption of the process of identifying the types of the recognized obstacles to be performed at the image processing device 10 later, and executes the process of identifying the types of the obstacle according to the estimated power consumption. For example, in a case where the estimated power consumption is lower than the set threshold, the object detection unit 12 determines to execute the process of identifying the types of the obstacles, and executes the process of identifying the types of the obstacles. On the other hand, the object detection unit 12 does not execute the process of identifying the types of the obstacles in a case where the estimated power consumption is equal to or greater than the set threshold. Note that the threshold to be compared with the estimated power consumption at this time is a third threshold, and is preset to a value smaller than the upper limit value of power consumption set for the image processing device 10.

Specifically, the object detection unit 12 performs the process of identifying the types of the obstacles in the following manner. First, the object detection unit 12 identifies the shapes of individual obstacle areas where the obstacles are recognized, and performs pattern matching between the shapes and the shapes of known objects. For example, pattern data of the shapes of delivery goods and humans as the known objects is prepared in advance. Then, the object detection unit 12 identifies the type of an obstacle of each obstacle area as an object having a shape matching the shape of the obstacle area, for example the delivery goods T1 or the human T2. Then, the object detection unit 12 notifies the information generation unit 14 of identification results of the types of the respective obstacles. It should be noted that the process of identifying the types of obstacles performed by the object detection unit 12 is not necessarily performed by the method mentioned above, but may be performed by any method. Note that a reference sign A3 in FIG. 6 denotes a state of the process mentioned above. As depicted in frames denoted with reference signs P1 and P2, the conveyance robot R and the obstacles T1 and T2 are recognized from within an image, and, as depicted in a frame denoted with a reference sign P3, identification of the types of the obstacles T1 and T2 from within the image is also performed.

The power management unit 13 (identification means, estimation means) measures and identifies power consumption of the image processing device 10 in operation, and notifies the object detection unit 12 of the identified power consumption. For example, when the object detection unit 12 of the image processing device 10 is performing the process of recognizing the conveyance robot R, the power management unit 13 identifies power consumption of the image processing device 10 such that the power consumption includes power consumption required for the process. When the object detection unit 12 is performing the process of recognizing obstacles, the power management unit 13 identifies power consumption of the image processing device 10 such that the power consumption includes power consumption required for the process. In addition, in a case where the object detection unit 12 of the image processing device 10 has notified the power management unit 13 of the number of recognized obstacles, the power management unit 13 estimates power to be consumed when the image processing device 10 identifies the types of obstacles, the number of which is equal to the notified number, and notifies the object detection unit 12 of the estimated power consumption. For example, a calculation formula for calculating power to be consumed when the types of obstacles are identified according to the number of the obstacles is prepared in advance, and the power management unit 13 estimates power consumption using the calculation formula. Note that a reason why power consumption is estimated here is because power to be consumed subsequently in the process of identifying types and the like varies according to the number of obstacles, and the estimated power consumption is used for determining whether to perform the subsequent processes.

On the basis of information about the conveyance robot R and the obstacles T1 and T2 notified from the object detection unit 12 as mentioned above, the information generation unit 14 generates positional information about the conveyance robot R and the obstacles T1 and T2, and notifies the management/control device 20 of the information. For example, the information generation unit 14 notifies positional information including the coordinates of the conveyance robot R on an image from which the conveyance robot R is recognized, and notifies positional information about grid squares G for which a determination U1 that there is an obstacle has been made or a determination U2 that it is unknown whether there is an obstacle has been made as a result of recognition of the obstacles T1 and T2. In addition, the information generation unit 14 notifies the management/control device 20 also of the identified types of the obstacles.

The management/control device 20 is configured using one or more information processing devices including an arithmetic operation device and a storage device. As depicted in FIG. 5, the management/control device 20 includes a communication unit 25, and is connected, at the communication unit 25, to the image processing device 10 mentioned above via a communication device such as a hub. In addition, the communication unit 25 can be connected to the conveyance robot R via a wireless communication device, and can transmit a conveyance control signal as mentioned later.

In addition, as depicted in FIG. 5, the management/control device 20 includes the grid setting unit 21 and a management/control unit 22. Respective functions of the grid setting unit 21 and the management/control unit 22 can be realized by execution, by the arithmetic operation device, of programs for realizing the respective functions stored on the storage device. Hereinbelow, respective configurations are mentioned in detail.

The grid setting unit 21 notifies the image processing device 10 of setting information about the grid squares G in the images set by the object detection unit 12 as mentioned above. For example, the setting information about the grid squares G includes the size of the grid squares G and their reference point.

The management/control unit 22 controls the movement of the conveyance robot G in the warehouse. Specifically, using the positional information about the conveyance robot, and the type and positional information about the obstacles T1 and T2 notified from the information generation unit 14 of the image processing device 10 as mentioned above, the management/control unit 22 first forms and manages a map of an area where the conveyance robot R performs conveyance. Then, on the basis of the map, the management/control unit 22 performs control to set a moving path of the conveyance robot R, give the conveyance robot R an instruction about the moving path, causes the conveyance robot R to move, and so on.

Operations

Next, operations of the information processing system mentioned above, in particular operations performed by the image processing device 10, are explained mainly with reference to a flowchart in FIG. 8.

The upper limit value of power consumption is set for the image processing device 10 in advance. For example, the upper limit value of power consumption is set according to the value of power that can be supplied by PoE. In addition, several thresholds of power consumption that are smaller than the upper limit value described above have been set for the image processing device 10. For example, as mentioned above, the first threshold, the second threshold, and the third threshold are set. When it is determined whether to or not to perform the process of recognizing obstacles, the first threshold is compared with power consumption at that time. When it is determined whether to or not to perform the process of identifying the types of the obstacles, the second threshold is compared with power consumption at that time.

The third threshold is compared with power consumption estimated according to the number of the obstacles in the process of identifying the types of the obstacles. In addition, it is assumed that time intervals at which the image acquisition process, the process of recognizing obstacles, and the process of identifying the types of the obstacles are performed also are preset.

First, the image processing device 10 receives grid setting information from the grid setting unit 21 of the management/control device 20 (step S1). Then, the image processing device 10 sequentially acquires images captured by the image-capturing device C (step S2), performs the process of recognizing the conveyance robot R from the images (step S3), and transmits, to the management/control device 20, positional information about the conveyance robot R in the images (step S4).

At this time, in a case where it is not a timing that comes at a preset interval like a time interval of several hundred microseconds to one second, that is, it is not a timing set as a timing when the process of recognizing obstacles is to be performed, the image processing device 10 returns to the process of acquiring subsequent images. That is, processes at step S5 and step S6 in FIG. 8 are not performed, and the procedure returns to step S2. Then, the image processing device 10 performs the process of recognizing the conveyance robot R on the acquired subsequent images (step S3), and transmits the positional information (step S4). On the other hand, in a case where it is a timing that comes at the interval described above, the image processing device 10 calculates and identifies power consumption of the image processing device itself including power consumption required for the process of recognizing the conveyance robot R (step S5), and checks whether or not the power consumption is lower than the first threshold (step S6). In a case where the identified power consumption is equal to or greater than the first threshold (No at step S6), the image processing device 10 does not execute the process of recognizing obstacles, and proceeds to recognition of the conveyance robot R on subsequent images (step S2). On the other hand, in a case where the identified power consumption is lower than the first threshold (Yes at step S6), the image processing device 10 executes the process of recognizing obstacles (step S7). That is, since there is extra power to be consumed, the image processing device 10 performs the process of recognizing objects other than the conveyance robot R, that is, the objects T1 and T2 that can be obstacles.

Then, the image processing device 10 performs the process of recognizing the obstacles T1 and T2 from images (step S7), and transmits, to the management/control device 20, positional information about grid squares where the obstacles T1 and T2 are positioned in the images (step S8). Furthermore, at this time, in a case where it is not a timing that comes at a preset interval like a time interval of one second or longer, that is, it is not a timing set as a timing when the process of identifying the types of obstacles is to be performed, processes at step S9 and step S10 in FIG. 8 are not performed, the procedure returns to step S2, and the image processing device 10 proceeds to recognition of the conveyance robot R on subsequent images. On the other hand, in a case where it is a timing that comes at the interval described above, the image processing device 10 calculates and identifies power consumption of the image processing device itself including power consumption required for the process of recognizing the obstacles T1 and T2 (step S9), and checks whether or not the power consumption is lower than the second threshold (step S10). In a case where the identified power consumption is equal to or greater than the second threshold (No at step S10), the image processing device 10 proceeds to recognition of the conveyance robot R on subsequent images (step S2). On the other hand, in a case where the identified power consumption is lower than the second threshold (Yes at step S10), the image processing device 10 proceeds to the process of identifying the types of the recognized obstacles (step S11). That is, since there is extra power to be consumed, the image processing device 10 further performs the process of identifying the types of the obstacles T1 and T2.

Note that, at step S10, the image processing device 10 may estimate power consumption of the process of identifying the types of recognized obstacles based on the number of the recognized obstacles T1 and T2. Then, the image processing device 10 may execute the process of identifying the types of obstacles in a case where the estimated power consumption is smaller than the third threshold.

Then, the image processing device 10 performs the process of identifying the types of the obstacles T1 and T2 recognized from the images (step S11), and transmits obstacle information including the types of the obstacles T1 and T2 to the management/control device 20 (step S12). Thereafter, the image processing device 10 proceeds to recognition of the conveyance robot R on subsequent images (step S2), and repeats the processes mentioned above.

By the processes performed by the image processing device 10 mentioned above, the management/control device 20 acquires positional information about the conveyance robot and type and positional information about the obstacles T1 and T2, and, using the information, forms and manages a map of an area where the conveyance robot R performs conveyance. Then, on the basis of the map, the management/control device 20 controls conveyance operation to set a moving path of the conveyance robot R, give the conveyance robot R an instruction about the moving path, and so on.

As mentioned above, the image processing device 10 in the present example embodiment always performs recognition of the conveyance robot R performed on acquired images first, further performs recognition of the obstacles T1 and T2 in a case where there is extra power to be consumed at that time, and further performs identification of the types of the obstacles T1 and T2 in a case where there is extra power to be consumed. In this manner, the image processing device 10 performs image processing such as the recognition process on images stepwise according to the situation of power consumption. Accordingly, it is possible to reduce excessive consumption of power while performing necessary image processing and acquiring necessary information. As a result, it is possible to reduce stops of image processing due to power shortage, and it is possible to attempt to improve the operational stability of the image processing device 10.

In particular, in a case where the image processing device 10 forms a network camera, and is supplied with power by PoE as in the present example embodiment, the operation of the system is stabilized while executing necessary image processing even in a situation where the value of power that can be supplied is limited.

Specifically, in the present example embodiment, recognition of the conveyance robot R, and also the process of detecting the obstacles T1 and T2 in advance are performed on images captured by the image-capturing device C installed on a ceiling or the like. Because of this, the obstacles T1 and T2 can be avoided smoothly when movement control of the conveyance robot R is performed.

Here, whereas it is explained in the description above that the object detection unit 12 performs the process of recognizing obstacles at time intervals of several hundred microseconds to one second, and the process of recognizing obstacles at time intervals one second or longer, the setting values of the time intervals may be changed according to power consumption. For example, the object detection unit 12 may change at least either of the time intervals at which the process of recognizing obstacles is performed and the time intervals at which the process of identifying the types of the obstacles is performed according to the value of power consumption at the time of the process of recognizing the conveyance robot R. For example, the time intervals may be set greater in a case where the power consumption is equal to or greater than a predetermined threshold. In addition, for example, the object detection unit 12 may change the time intervals at which the process of identifying the types of obstacles is performed according to the value of power consumption at the time of the process of recognizing obstacles. For example, the time intervals may be set greater in a case where the power consumption is equal to or greater than a predetermined threshold. Furthermore, for example, the object detection unit 12 may change the time intervals at which the process of identifying the types of obstacles is performed according to the value of estimated power consumption in the process of identifying the types of the obstacles. For example, the time intervals may be set greater in a case where the power consumption is equal to or greater than a predetermined threshold.

Third Example Embodiment

Figure 9:
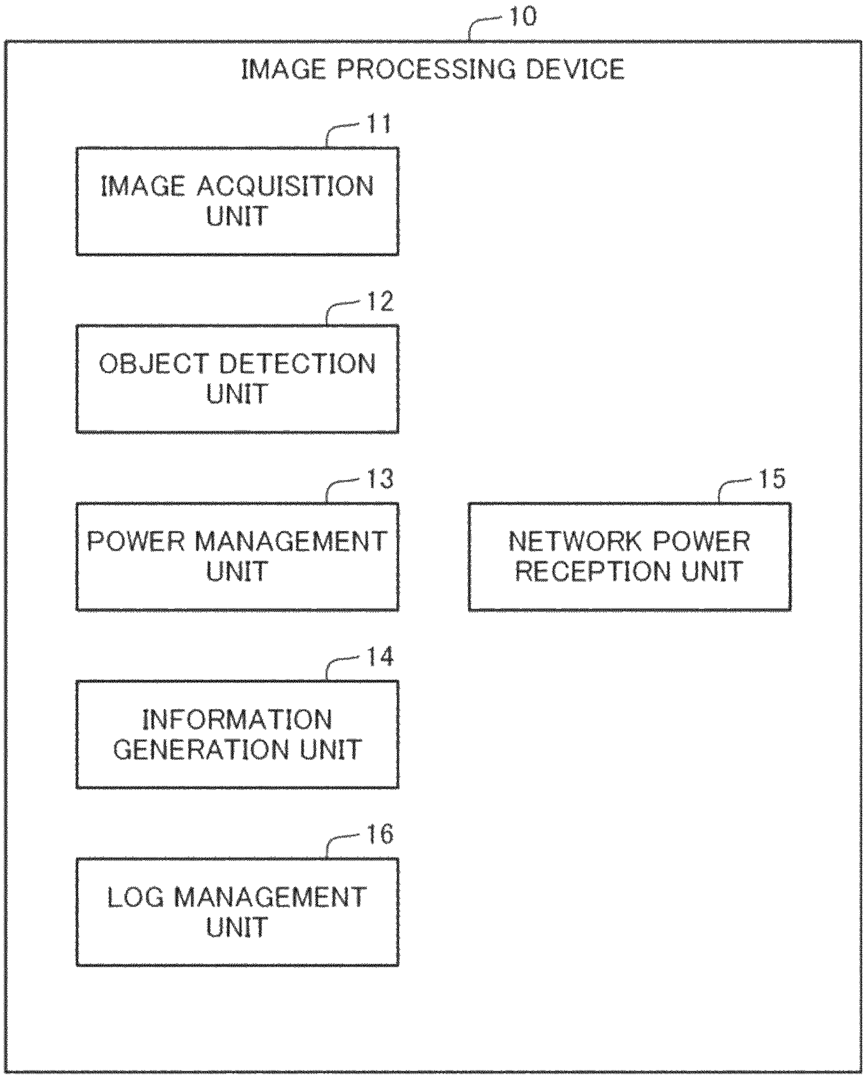
FIG. 9 is a block diagram depicting the configuration of the image processing device in a third example embodiment of the present invention.
Figure 10:
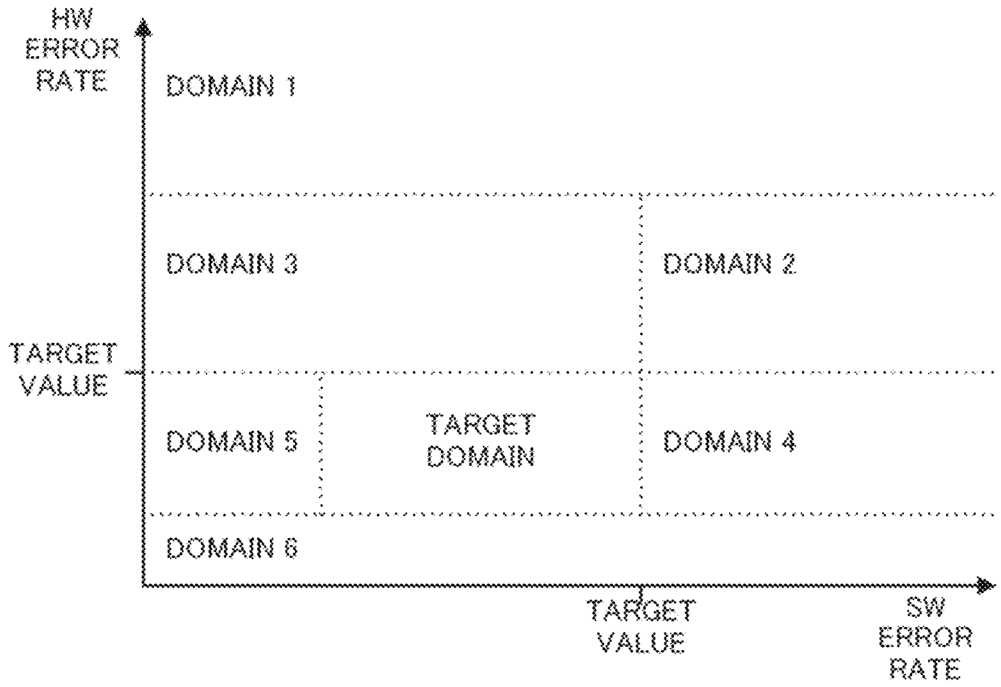
FIG. 10 is a figure depicting a state of a process performed by the image processing device disclosed in FIG. 9.

Next, a third example embodiment of the present invention is explained with reference to FIG. 9 to FIG. 10. FIG. 9 is a figure for explaining the configuration of the image processing device in the third example embodiment, and FIG. 10 is a figure for explaining a processing operation performed by the image processing device.

The image processing device 10 in the present example embodiment further includes a log management unit 16 as depicted in FIG. 9 in addition to the configuration explained in the first example embodiment mentioned above and depicted in FIG. 5. The log management unit 16 is realized by execution of a program by the arithmetic operation device. Hereinbelow; differences from the configuration of the second example embodiment are explained mainly.

The log management unit 16 (detection means) stores a log of malfunctions that have occurred to the image processing device 10, and calculates the severities of the malfunctions. Specifically, the log management unit 16 stores a log of malfunctions of preset items that have occurred to each of hardware and software mounted on the image processing device 10. It is assumed, as an example, that a malfunction that occurs to the hardware is a stop of an operation performed by the image processing device 10, and a malfunction that occurs to the software is a stop of a process performed by the software or an end of the software. It should be noted that malfunctions that occur to the image processing device 10 are not limited to the content mentioned above.

The log management unit 16 calculates an error rate representing the probability of occurrence based on the number of times of malfunctions that have occurred to each of the hardware and the software mentioned above. For example, the log management unit 16 calculates an error rate at predetermined time intervals like, for example, every hour, and plots error rates of the hardware and error rates of the software on an error rate table having a vertical axis representing error rates of the hardware and a horizontal axis representing error rates of the software as depicted in FIG. 10. At this time, on the error rate table, a target value (e.g. 0.1%) of each type of error rate, thresholds lower than the target values, and thresholds higher than the target values are set as represented by dotted lines, and a target domain and respective domains 1 to 6 divided by the values are set. Note that the target domain on the error rate table in FIG. 10 is a domain corresponding to error rates of both the hardware and the software that are equal to or lower than the target values, and are equal to or greater than the lower thresholds.

Then, the power management unit 13 (setting means) in the present example embodiment has a function to change settings related to power consumption such as the upper limit value of power consumption set for the image processing device 10, image acquisition intervals, intervals of each type of image processing, or the first threshold, second threshold, and third threshold mentioned above, according to the current error rates plotted on the error rate table mentioned above. For example, the power management unit 13 keeps the current settings unchanged in a case where the current error rates belong to the target domain. On the other hand, in a case where the current error rates belong to the domain 1, the power management unit 13 changes the settings in a direction to lower power consumption since the error rates are high, and stable operation is not being performed. For example, the upper limit value of power consumption that is set stepwise is lowered by two levels, and image acquisition intervals are increased to the maximum value, or each threshold is minimized. Note that each threshold also may be set to any of multiple levels, and its setting may be changed to a threshold set according to a domain to which the error rates belong. In addition, similarly, in a case where the current error rates belong to any of the domains 2 to 4, the power management unit 13 changes the settings in a direction to lower power consumption since the error rates are still high, and stable operation is not being performed yet. For example, in a case where the current error rates belong to the domain 2, the upper limit value of power consumption is lowered by one level, the image acquisition intervals are increased by one level, and each threshold is lowered by one level. In a case where the current error rates belong to the domain 3, the upper limit value of power consumption is lowered by one level, and, in a case where the current error rates belong to the domain 4, the image acquisition intervals are increased by one level, and each threshold is lowered by one level. On the other hand, in a case where the current error rates belong to any of the domains 5 and 6, the settings are changed in a direction to increase power consumption because the error rates are lower than tolerated values, and this means that the power supply resource is not used fully. For example, in a case where the current error rates belong to the domain 5, the image acquisition intervals are lowered by one level, and each threshold is increased by one level. In a case where the current error rates belong to the domain 6, the upper limit value of power consumption is increased by one level.

As mentioned above, the present example embodiments can achieve such an operational state that power can be used effectively while realizing stable operation according to the operational status, in particular the error occurrence status, of the image processing device 10.

While the present invention has been explained thus far with reference to the example embodiments and the like described above, the present invention is not limited to the example embodiments mentioned above. The configurations and details of the present invention can be changed within the scope of the present invention in various manners that can be understood by those skilled in the art. In addition, at least one or more functions of the functions mentioned above may be executed at an information processing device installed and connected at any location on a network, that is, may be executed by so-called cloud computing. In addition, the respective functions mentioned above are not necessarily mounted on one information processing device, but may be mounted on a plurality of discrete information processing devices.

Note that the program mentioned above can be supplied to a computer by being stored in a non-transitory computer readable medium of any type. Non-transitory computer readable media include tangible recording media (tangible storage media) of various types. Examples of non-transitory computer readable media include a magnetic recording medium (e.g. flexible disk, magnetic tape, hard disk drive), a magneto-optical recording medium (e.g. magneto-optical disk), a CD-ROM (Read Only Memory), a CD-R, a CD-R/W, a semiconductor memory (e.g. mask ROM, PROM (Programmable ROM), and EPROM (Erasable PROM), a flash ROM, and a RAM (Random Access Memory)). In addition, the program may be supplied to a computer by being stored in a transitory computer readable medium of any type. Examples of transitory computer readable media include an electric signal, an optical signal, and an electromagnetic wave. A transitory computer readable medium can supply programs to a computer via a wired communication channel such as an electric wire or an optical fiber, or a wireless communication channel.

Supplementary Notes

Part of or the whole of the example embodiments described above can also be described as in the following supplementary notes. Hereinbelow, outlines of the configurations of an image processing device, an image processing method, an information processing system, and a program according to the present invention are explained. It should be noted that the present invention is not limited to the following configurations.

Supplementary Note 1

An image processing device including:

a first processing means that performs a first process of recognizing a first target from an image;

an identification means that identifies power consumption required for the first process; and a determination means that determines whether to perform a second process of recognizing a second target from the image according to the identified power consumption.

Supplementary Note 2

The image processing device according to supplementary note 1, in which the identification means identifies power consumption required for the second process, and the determination means determines whether to execute a third process of identifying a type of the second target from the image according to the identified power consumption required for the second process.

Supplementary Note 3

The image processing device according to supplementary note 2, further including an estimation means that estimates power consumption required for the third process on a basis of a result of the second process, in which the determination means determines whether to execute the third process according to the estimated power consumption.

Supplementary Note 4

The image processing device according to supplementary note 3, in which the estimation means estimates the power consumption required for the third process on a basis of the number of the second targets recognized from the image.

Supplementary Note 5

The image processing device according to any one of supplementary notes 2 to 4, in which the determination means changes a timing at which the second process or the third process is performed according to the identified power consumption required for the first process.

Supplementary Note 6

The image processing device according to supplementary note 3 or 4, in which the determination means changes a timing at which the third process is performed according to the estimated power consumption.

Supplementary Note 7

The image processing device according to any one of supplementary notes 1 to 6, further including:

a detection means that detects a severity of a malfunction that has occurred to the image processing device; and a setting means that sets a threshold according to the severity of the malfunction, in which the determination means determines whether to recognize the second target from the image according to the power consumption and the threshold.

Supplementary Note 8

An image processing method including:

performing a first process of recognizing a first target from an image;

identifying power consumption required for the first process; and determining whether to perform a second process of recognizing a second target from the image according to the identified power consumption.

Supplementary Note 9

The image processing method according to supplementary note 8, further including:

identifying power consumption required for the second process, and determining whether to execute a third process of identifying a type of the second target from the image according to the identified power consumption required for the second process.

Supplementary Note 10

The image processing method according to supplementary note 9, further including:

estimating power consumption required for the third process on a basis of a result of the second process; and determining whether to execute the third process according to the estimated power consumption.

Supplementary Note 11

The image processing method according to supplementary note 10, further including estimating the power consumption required for the third process on a basis of the number of the second targets recognized from the image.

Supplementary Note 12

The image processing method according to any one of supplementary notes 9 to 11, further including changing a preset timing at which the second process or the third process is performed according to the identified power consumption required for the first process.

Supplementary Note 13

The image processing method according to supplementary note 10 or 11, further including changing a preset timing at which the third process is performed according to the estimated power consumption.

Supplementary Note 14

The image processing method according to any one of supplementary notes 8 to 13, further including:

detecting a severity of a malfunction that has occurred to an image processing device; and setting a threshold according to the severity of the malfunction; and determining whether to recognize the second target from the image according to the power consumption and the threshold.

Supplementary Note 15

An information processing system including:

a first processing means that performs a first process of recognizing a first target from an image;

an identification means that identifies power consumption required for the first process; and a determination means that determines whether to recognize a second target from the image according to the identified power consumption.

Supplementary Note 16

The information processing system according to supplementary note 15, in which the identification means identifies power consumption required for the second process, and the determination means determines whether to perform a second process to execute a third process of identifying a type of the second target from the image according to the identified power consumption required for the second process.

Supplementary Note 17

The information processing system according to supplementary note 16, further including an estimation means that estimates power consumption required for the third process on a basis of a result of the second process, in which the determination means determines whether to execute the third process according to the estimated power consumption.

Supplementary Note 18

The information processing system according to supplementary note 17, in which the estimation means estimates the power consumption required for the third process on a basis of the number of the second targets recognized from the image.

Supplementary Note 19

The information processing system according to any one of supplementary notes 16 to 18, in which the determination means changes a timing at which the second process or the third process is performed according to the identified power consumption required for the first process.

Supplementary Note 20

The information processing system according to supplementary note 17 or 18, in which the determination means changes a timing at which the third process is performed according to the estimated power consumption.

Supplementary Note 21

The information processing system according to any one of supplementary notes 15 to 20, further including:

a detection means that detects a severity of a malfunction that has occurred to the information processing system; and a setting means that sets a threshold according to the severity of the malfunction, in which the determination means determines whether to recognize the second target from the image according to the power consumption and the threshold.

Supplementary Note 22

A program for causing a computer to execute processes of:

performing a first process of recognizing a first target from an image;

identifying power consumption required for the first process; and determining whether to recognize a second target from the image according to the identified power consumption.

Note that the present invention is based upon and claims the benefit of priority from Japanese patent application No. 2022-053557, filed on Mar. 29, 2022, the disclosure of which is incorporated herein in its entirety by reference.

REFERENCE SIGNS LIST

10: Image processing device
11: Image acquisition unit
12: Object detection unit
13: Power management unit
14: Information generation unit
15: Network power reception unit
16: Log management unit
20: Management/control device
21: Grid setting unit
22: Management/control unit
25: Communication unit
C: Image-capturing device
R: Conveyance robot
T1, T2: Obstacle
100: Image processing device
101: CPU
102: ROM
103: RAM
104: Program group
105: Storage device
106: Drive
107: Communication interface
108: Input/output interface
109: Bus
110: Storage medium
111: Communication network
121: First processing means
122: Identification means
123: Determination means
130: Image-capturing device

What is claimed is:

1. An image processing device comprising:

at least one memory configured to store instructions; and at least one processor configured to execute instructions to:

always perform a first process of recognizing a first target from an image;

identify power consumption required for the first process; and perform a second process of recognizing a second target from the image in a case where there is extra power based on the identified power consumption.

2. The image processing device according to claim 1, wherein the at least one processor is configured to execute the instructions to:

identify power consumption required for the second process; and execute a third process of identifying a type of the second target from the image in a case where there is extra power based on the identified power consumption required for the second process.

3. The image processing device according to claim 2, wherein the at least one processor is configured to execute the instructions to:

estimate power consumption required for the third process on a basis of a result of the second process; and determine whether to execute the third process according to the estimated power consumption.

4. The image processing device according to claim 3, wherein the at least one processor is configured to execute the instructions to estimate the power consumption required for the third process on a basis of the number of the second targets recognized from the image.

5. The image processing device according to claim 2, wherein the at least one processor is configured to execute the instructions to change a timing at which the second process or the third process is performed according to the identified power consumption required for the first process.

6. The image processing device according to claim 3, wherein the at least one processor is configured to execute the instructions to change a timing at which the third process is performed according to the estimated power consumption.

7. The image processing device according to claim 1, wherein the at least one processor is configured to execute the instructions to:

detect a severity of a malfunction that has occurred to the image processing device;

set a threshold according to the severity of the malfunction; and determine whether to recognize the second target from the image according to the power consumption and the threshold.

8. The image processing device according to claim 1, wherein the at least one processor is configured to execute the instructions to:

always perform the first process of recognizing the first target that is a conveyance robot from the image;

execute the second process of recognizing the second target that is an obstacle from the image in a case where there is extra power based on the identified power consumption required for the first process.

9. The image processing device according to claim 8, wherein the at least one processor is configured to execute the instructions to:

identify power consumption required for the second process; and execute a third process of identifying a type of the second target that is an obstacle from the image in a case where there is extra power based on the identified power consumption required for the second process.

10. An image processing method comprising:

always performing a first process of recognizing a first target from an image;

identifying power consumption required for the first process; and performing a second process of recognizing a second target from the image in a case where there is extra power based on the identified power consumption.

11. The image processing method according to claim 10, further comprising:

identifying power consumption required for the second process, and executing a third process of identifying a type of the second target from the image in a case where there is extra power based on the identified power consumption required for the second process.

12. The image processing method according to claim 11, further comprising:

estimating power consumption required for the third process on a basis of a result of the second process; and determining whether to execute the third process according to the estimated power consumption.

13. The image processing method according to claim 12, further comprising estimating the power consumption required for the third process on a basis of the number of the second targets recognized from the image.

14. The image processing method according to claim 11, further comprising changing a preset timing at which the second process or the third process is performed according to the identified power consumption required for the first process.

15. The image processing method according to claim 12, further comprising changing a preset timing at which the third process is performed according to the estimated power consumption.

16. The image processing method according to claim 10, further comprising:

detecting a severity of a malfunction that has occurred to an image processing device; and setting a threshold according to the severity of the malfunction; and determining whether to recognize the second target from the image according to the power consumption and the threshold.

17. A non-transitory computer readable storage medium having stored thereon a program comprising instructions for causing a computer to execute processes of:

always performing a first process of recognizing a first target from an image;

identifying power consumption required for the first process; and performing a second process of recognizing a second target from the image in a case where there is extra power based on the identified power consumption.

* * * * *